(12) United States Patent
Hsu

(10) Patent No.: US 8,740,161 B2
(45) Date of Patent: Jun. 3, 2014

(54) HOLDER

(75) Inventor: Wen-Sheng Hsu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 263 days.

(21) Appl. No.: 12/631,303

(22) Filed: Dec. 4, 2009

(65) Prior Publication Data

US 2010/0282930 A1 Nov. 11, 2010

(30) Foreign Application Priority Data

May 7, 2009 (TW) ................................ 98115101 A

(51) Int. Cl.
*A45D 42/14* (2006.01)
*F16B 47/00* (2006.01)
*F16M 11/02* (2006.01)

(52) U.S. Cl.
USPC .............. 248/205.5; 248/206.5; 248/206.2; 248/205.8; 248/206.3; 248/362; 248/363; 248/516; 248/181.1; 248/181.2; 248/288.31; 248/288.51; 248/309.3; 248/683; 248/537; 248/205.7

(58) Field of Classification Search
USPC .......... 248/205.5, 206.5, 206.2, 205.8, 206.3, 248/362, 363, 516, 181.1, 181.2, 288.31, 248/288.51, 309.3, 683, 537, 205.7
See application file for complete search history.

(56) References Cited

U.S. PATENT DOCUMENTS

| | | | |
|---|---|---|---|
| 2,146,859 A | 2/1939 | Seklehner | |
| 3,424,419 A * | 1/1969 | Siegel | 248/231.71 |
| 5,280,871 A * | 1/1994 | Chuang | 248/516 |
| 5,411,230 A * | 5/1995 | Messinger | 248/205.8 |
| 6,478,276 B1 | 11/2002 | Louh | |
| 6,942,190 B1 | 9/2005 | Lu | |
| 7,387,284 B2 * | 6/2008 | Chang | 248/206.5 |
| 2005/0247840 A1 * | 11/2005 | Zhadanov et al. | 248/316.7 |
| 2005/0284998 A1 * | 12/2005 | Tsay | 248/309.3 |
| 2007/0257167 A1 * | 11/2007 | Richter | 248/205.8 |
| 2007/0262217 A1 * | 11/2007 | Wang et al. | 248/205.5 |

(Continued)

FOREIGN PATENT DOCUMENTS

| CH | 213760 | 3/1941 |
|---|---|---|
| CN | 101233014 | 7/2008 |

(Continued)

OTHER PUBLICATIONS

Search Report from corresponding EPO Application No. 09179973.4 dated Mar. 10, 2010.

(Continued)

*Primary Examiner* — Terrell McKinnon
*Assistant Examiner* — Christopher Garft
(74) *Attorney, Agent, or Firm* — Grossman, Tucker, Perreault & Pfleger, PLLC

(57) ABSTRACT

A holder for sustaining a handheld electronic device is provided. The holder includes a sucker and a positioning device. The sucker has a central and peripheral portion. The positioning device, which is disposed on a side of the sucker, comprises a housing, a ball, a clamping assembly and a rod. The housing is disposed on the sucker and has a receiving space for the ball and the clamping assembly. The rod has a first end connecting to the central portion of the sucker and a second end extending towards the receiving space. When the rod is led to position the sucker onto an object, the clamping assembly is adapted to restrict the ball simultaneously.

6 Claims, 4 Drawing Sheets

(56) References Cited

U.S. PATENT DOCUMENTS

| | | | |
|---|---|---|---|
| 2008/0061199 A1 | 3/2008 | Chen | |
| 2009/0189033 A1* | 7/2009 | Lin | 248/205.5 |
| 2009/0294609 A1* | 12/2009 | Riddiford et al. | 248/206.2 |
| 2009/0297609 A1 | 12/2009 | Shoichet et al. | |
| 2009/0308993 A1 | 12/2009 | Chang | |

FOREIGN PATENT DOCUMENTS

| | | | |
|---|---|---|---|
| DE | 20 2006 000512 | 6/2006 | |
| TW | M290322 | 5/2006 | |
| TW | M307940 | 3/2007 | |
| TW | M349441 | 1/2009 | |
| WO | WO 2007015641 A2 * | 2/2007 | B60R 11/02 |

OTHER PUBLICATIONS

Office Action from corresponding EPO Application No. 09179973.4 dated Mar. 23 2010.

Office Action from corresponding Taiwanese Appln. No. 098115101 dated Jan. 22, 2013. English machine translation attached.

Office Action from corresponding Chinese Application No. 200910141300.0 dated Nov. 30, 2011. English translation of pertinent descriptions cited in the Office Action.

* cited by examiner

HOLDER

This application claims the benefit from the priority to Taiwan Patent Application No. 098115101 filed on May 7, 2009, the disclosure of which is incorporated by reference herein in their entirety.

CROSS-REFERENCES TO RELATED APPLICATIONS

Not applicable.

BACKGROUND OF THE INVENTION

1. Field of the Invention

The present application relates to a holder, and more particularly, to a holder for sustaining a handheld electronic device.

2. Descriptions of the Related Art

Driven by the advancement in science and technology as well as the demands of various applications, electronic devices with various functions such as mobile phones, global positioning system (GPS) devices, audio & video players and the like have become increasingly popular and are becoming smaller for portability. If an electronic device is to be used by a user at irregular times on a non-continuous basis, the electronic device will need to be disposed near the user for use at any time, an example of which is the GPS device that is used during traveling. In such a case, an appropriate holder becomes necessary for disposing the electronic device at a specific location in a configuration that facilitates operation.

A conventional holder typically has an end thereof adsorbed to a specific surface by means of a sucker or the like, leaving the other end for placement of the electronic device. To facilitate the adjustment of the displaying angle of the electronic device by the user, an angle adjustment and locking mechanism is provided at a position on the holder that engages with the electronic device. In other words, the user must have the holder attached first before adjusting the position of the electronic device. Hence, such a holder is still inconvenient for use.

SUMMARY OF THE INVENTION

The present application provides a holder which is capable of fixing an operational angle of an electronic device while fixing a sucker.

A holder disclosed in the present application includes a sucker, a positioning device and a connector. The sucker has a central portion and a peripheral portion. The positioning device is disposed on the side of the sucker and includes a housing, a ball, a clamping assembly and a rod. The housing is disposed on the sucker and forms a receiving space therein. The ball and the clamping assembly are disposed in the receiving space. The rod has the first and second ends, in which the first end connects to the central portion of the sucker and the second end extends towards the receiving space. The connector connects to the ball for sustaining the handheld electronic device. The clamping assembly simultaneously restricts the ball when the rod is lifted to position the sucker onto an object.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
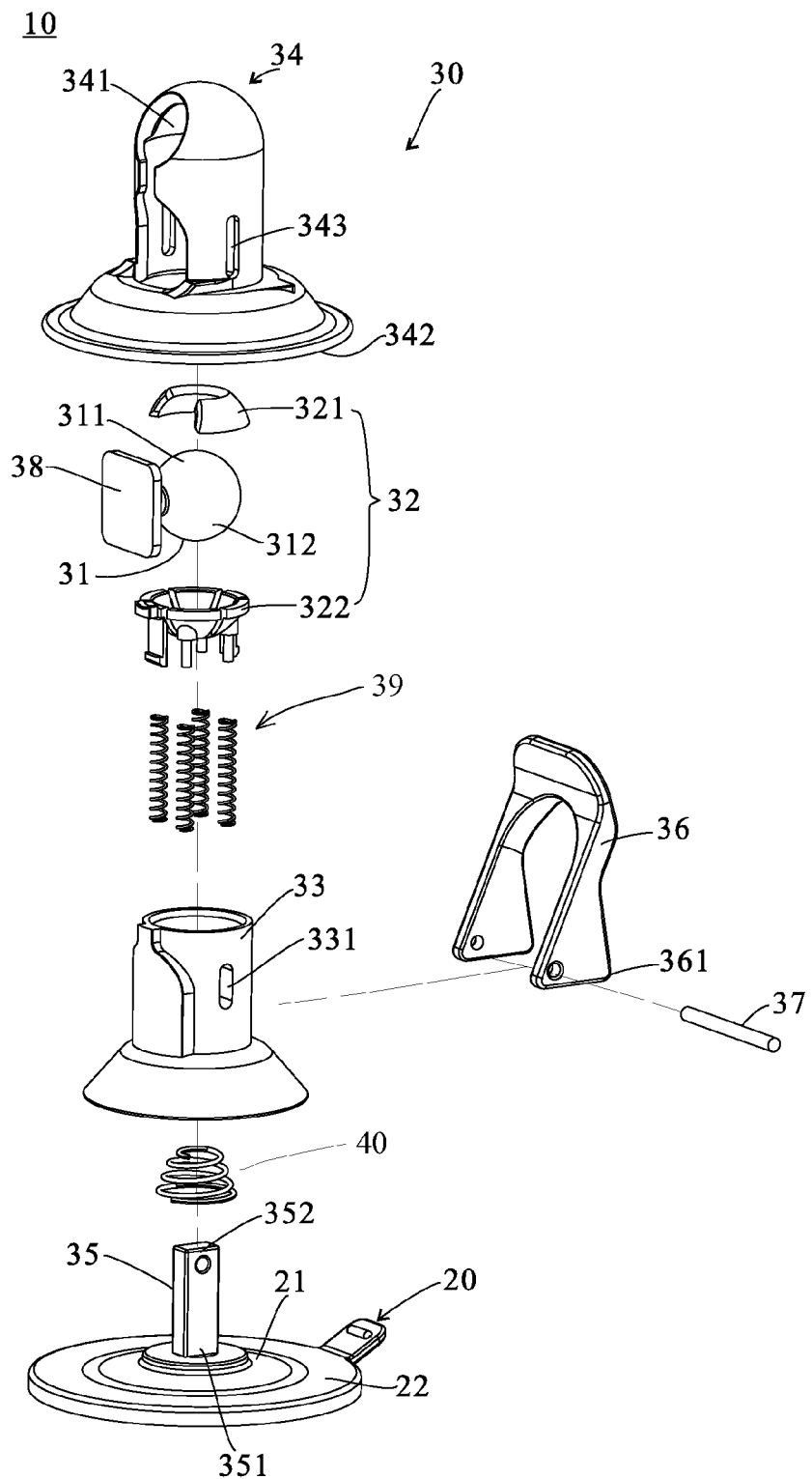
FIG. 1 is a schematic exploded view of a holder according to an embodiment of the present invention.
Figure 2A:
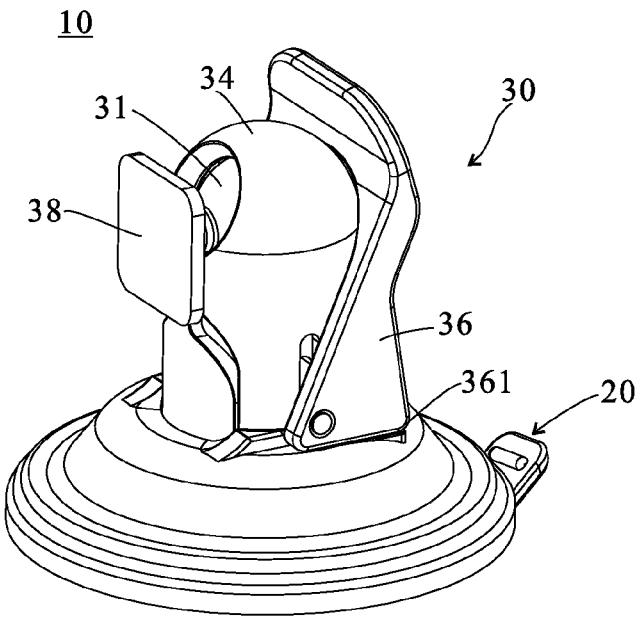
FIG. 2A is a schematic view of the holder according to the embodiment of the present invention in an unlocked status.
Figure 2B:
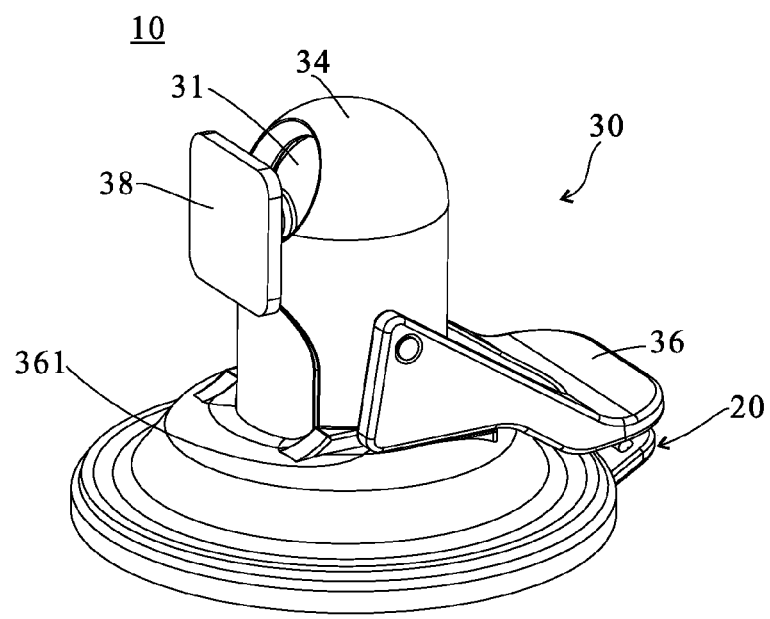
FIG. 2B is a schematic view of the holder according to the embodiment of the present invention in a locked status.

In reference to FIGS. 1, 2A and 2B, a holder 10 disclosed in an embodiment of the present invention is adapted for sustaining a device (not shown), for example, connecting to the device by means of a connector 38 thereof. In particular, the device may be a wide variety of electronic devices, such as mobile phones, GPS devices, audio & video players and the like. The holder 10 is positioned on the surface of an object (not shown), e.g., a windscreen or the dashboard of a vehicle, so that the handheld electronic device can be oriented in a way that can be used by the user.

In more detail, the holder 10 of the present embodiment includes a sucker 20, a positioning device 30 and a connector 38. The sucker 20 has a central portion 21 and a peripheral portion 22. The positioning device 30 is disposed on the side of the sucker 20, and includes a ball 31, a clamping assembly 32, a support element 33, a housing 34 and a rod 35. The housing 34 of the positioning device 30 is disposed on the sucker 20 and forms therein a receiving space 341, in which the ball 31 and the clamping assembly 32 are disposed. The clamping assembly 32 is adapted to fix the ball 31 by restricting the ball 31.

The rod 35 of the positioning device 30 has a first end 351 and a second end 352. The first end 351 connects to the central portion 21 of the sucker 20 and is preferably wrapped by the sucker 20, while the second end 352 extends towards the receiving space 341. The connector 38 connects with the ball 31 to sustain the handheld electronic device. The clamping assembly 32 can restrict the ball 31 when the rod 35 is lifted upwards to position the sucker 20 onto an object. Hence, as compared to the prior art, the holder 10 of the present embodiment can, by use of the clamping assembly 32, secure the ball 31 more effectively and, meanwhile, allow for easier adjustment by the user. The method in which the clamping assembly 32 secures the ball 31 will be further described hereinafter.

As shown in FIG. 1, in the embodiment of the present invention, the clamping assembly 32 includes an upper clamping element 321 disposed above the ball 31 and a lower clamping element 322 disposed between the ball 31 and the support element 33, with the upper clamping element 321 and the lower clamping element 322 clamping the upper surface 311 and lower surface 312 of the ball 31 respectively. The support element 33, which is disposed beneath the ball 31, is adapted to clamp the ball 31 with the housing 34. More specifically, the support element 33 is located beneath the lower clamping element 322 and adapted to attach the lower clamping element 322 to the ball 31. The receiving space 341 formed inside the housing 34 is also adapted to receive the upper clamping element 321 and the lower clamping element 322. Additionally, the housing 34 is formed with a first slot 343, while the support element 33 is formed with a second slot 331 for the pivot 37 to be inserted therethrough. The pivot 37 is pivoted to the handle 36 and the second end 352 of the rod 35.

The housing 34 has an open end 342, and during the assembly of the positioning device 10, the clamping assembly 32, the support element 33 and the rod 35 are sequentially disposed into the receiving space 341 through the open end 342 and then pivoted by the pivot 37. At this point, the open end 342 is adapted to make contact with the peripheral portion 22 of the sucker 20, as shown by the schematic assembled view in FIG. 2A.

The handle 36 further has a fulcrum end 361. When the handle 36 is not pulled to exhibit an unlocked status, the fulcrum end 361 will not apply a force to the housing 34. Conceivably, at this point, the ball 31 is not restricted but exhibits a freely rotatable status so that the user may make an angular adjustment depending on operational needs. In reference to FIG. 2B, a schematic view when the handle 36 is pulled down to exhibit a locked status is shown therein. When the handle 36 is pulled down by the user, the fulcrum end 361 will lean against the housing 34 in such a way that the open end 342 of the housing 34 is pressed against the peripheral portion 22 of the sucker 20. The action of pulling down the handle 36 will also force the rod 35 to move upward by means of the pivot 37. Conceivably, the peripheral portion 22 of the sucker 20 is pressed downwards while the central portion 21 is lifted upwards so that a low-pressure space (not shown) is formed between the sucker 20 and the object. Formation of the low-pressure space allows for a secure adsorption of the sucker 20 onto the surface, thereby assisting in fixing the holder 10.

Figure 3A:
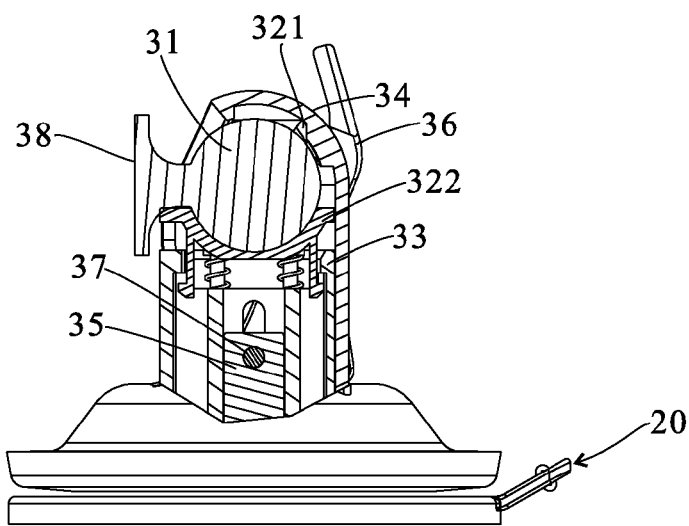
FIG. 3A is a schematic cross-sectional view of the positioning device in the unlocked status.

While the rod 35 is lifted upwards to form the low-pressure space under the bottom surface of the sucker 20, the pivot 37 slides along the second slot 331 and attaches the support element 33 to the ball 31. More specifically, under the action of the support element 33, the clamping assembly 32 restricts the ball 31. To facilitate the understanding of the technology of the present embodiment, FIG. 3A shows a schematic partial cross-sectional view of the positioning device 10 in an unlocked status. As shown, when the handle 36 is not pulled down, the ball 31 is simply received by the upper clamping element 321 and the lower clamping element 322 of the clamping assembly 32 and remains unlocked, so the ball 31 can still be adjusted in position as desired by the user.

Figure 3B:
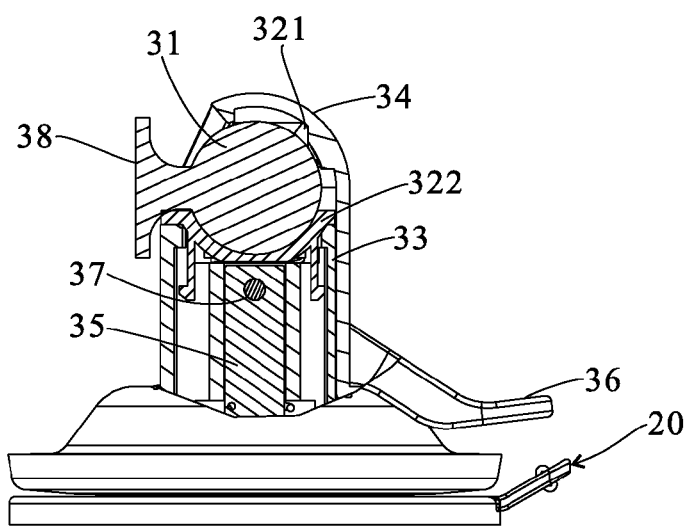
FIG. 3B is a schematic cross-sectional view of the positioning device in the locked status.

FIG. 3B is a schematic partial cross-sectional view of the positioning device 10 in the locked status. When the handle 36 is pulled down, the rod 35 will lift the support element 33 to force the lower clamping element 322 towards and to be closely attached to the lower surface 312 of the ball 31. As a result of forcing the lower clamping element 322 towards the lower surface 312 of the ball 31, the upper surface 311 of the ball 31 is also attached to the upper clamping element 321 so that the ball 31 is clamped by the upper clamping element 321 and the lower clamping element 322 together.

Figure 4A:
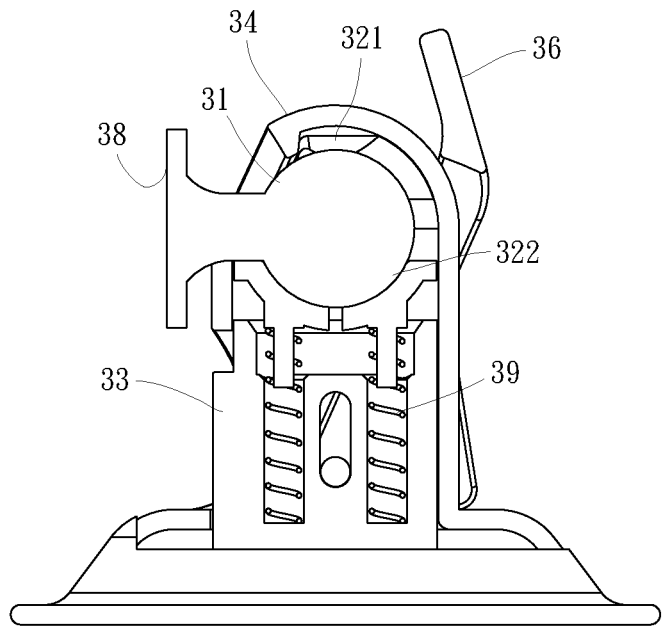
FIG. 4A is another schematic cross-sectional view of the positioning device in the unlocked status.

Hereinafter, the operations of the support element 33 and the lower clamping element 322 will be described. As shown in FIG. 1, the positioning device 30 may further include a plurality of first elastic elements 39, each of which has one end inserted over the protrusion of the lower clamping element 322 and the other end disposed in a recess of the support element 33 correspondingly. Furthermore, in reference to FIG. 4A, another schematic partial cross-sectional view of the positioning device 30 in the unlocked status is shown therein.

Figure 4B:
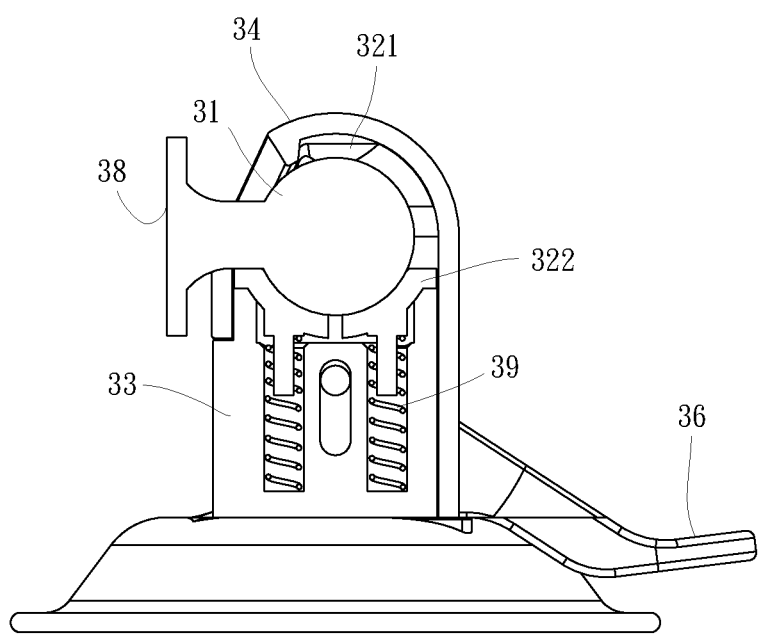
FIG. 4B is another schematic cross-sectional view of the positioning device in the locked status.

When the holder 10 has been assembled but the handle 36 is not pulled down, the first elastic elements 39 exhibit a slightly pre-compressed status. Then, as shown in FIG. 4B, when the handle 36 is pulled down by the user to exhibit the locked status, the support element 33 will force the elastic elements 39 to press against the lower clamping element 322 so that the lower clamping element 322 is closely attached to the lower surface 312 of the ball 31.

Additionally, the positioning device 30 may further include a second elastic element 40 disposed between the bottom of the support element 33 and the sucker 20. Once the handle 36 is released, the elasticity of the second elastic element 40 will slightly detach the support element 33 from the sucker 30 to allow the user to remove the sucker 20 from the surface of the object and place it in another appropriate position.

It shall be appreciated that the upper clamping element 321 of this embodiment is not limited to be assembled from separate parts, but may also be formed integrally on the inner surface of the housing 34 during the production of the housing 34. Furthermore, to improve the attachment between the upper clamping element 321 and the surface of the ball 31, the upper clamping element 321 may, depending on the material of the ball 31, be made of a suitable soft material to enhance the contact frictional force. The soft material may be, for example, polypropylene (PP), thermo-plastic rubber (TPR), polyoxymethylene (POM), polycarbonate (PC) or a combination thereof. The lower clamping element 322 may be formed of a deformable layer and a rigid layer, in which the deformable layer is adapted to be attached to the lower surface 312 of the ball 31 and the rigid layer is adapted to make contact with the support element 33. However, rather than being limited thereto, the aforesaid materials are only provided for illustration and may be substituted with other suitable materials by those of ordinary skill in the art.

Additionally, the connector 38 for connecting the holder 10 with the handheld electronic device has a first end and a second end opposite the first end. The first end connects to the ball 31, while the second end is adapted to connect with or support various handheld electronic devices. However, the connection between the holder 10 and the handheld electronic device may be implemented in different ways or the connector may be directly formed integrally with the ball 31, and rather than being limited to the configuration disclosed in this embodiment, the connector may also be substituted with other structures by those of ordinary skill in the art.

According to the above descriptions, with the design of the holder of the present application, the ball 31 can be restricted and the holder 10 be adsorbed to a specific surface both through a single action of pulling down the handle 36, which makes the operation much easier. Additionally, the holder of the present application is able to provide a sufficient clamping force, so it has a significantly improved stability and is less liable to displacement when subjected to an external force.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A holder for sustaining a handheld electronic device, the holder comprising:
a sucker having a central portion and a peripheral portion;

a positioning device being disposed on a side of the sucker, the positioning device comprising:
- a housing being disposed on the sucker and forming a first slot and a receiving space therein;
- a ball being disposed in the receiving space;
- a clamping assembly being disposed in the receiving space;
- a rod having a first end and a second end, in which the first end connects to the central portion of the sucker and the second end extends towards the receiving space;
- a support element disposed beneath the ball and forming a second slot, the support element and the housing being utilized to clamp the ball;
- a handle and a pivot, the pivot being utilized penetrating through the handle, the second end, the first slot and the second slot, and the pivot moves along a vertical direction for lifting the rod; and
- a plurality of first elastic elements and a second elastic element, the first elastic elements are disposed between the clamping assembly and the support element, and the second elastic element is disposed between the bottom of the support element and the sucker; and
- a connector connecting with the ball for sustaining the handheld electronic device;

wherein the clamping assembly comprises a lower clamping element and an upper clamping element, the lower clamping element is disposed between the ball and the support element, and the upper clamping element is disposed above the ball between the housing and the ball, wherein the support element operatively forcing the lower clamping element to attach to the ball and thus the upper clamping element and the lower clamping element operatively clamping the ball, and the rod is lifted upward to position the sucker onto an object and simultaneously forced the support element to attach to the ball when the handle is pulled.

2. The holder as claimed in claim 1, wherein the handle further comprises a fulcrum end for leaning against the housing to lift the rod when the handle is pulled.

3. The holder as claimed in claim 1, wherein the lower clamping element comprises a deformable layer and a rigid layer, in which the deformable layer attaches to the ball.

4. The holder as claimed in claim 1, wherein the upper clamping element is made of a soft material which is selected form the group of: polypropylene (PP), thermo-plastic rubber (TPR), polyoxymethylene (POM), polycarbonate (PC) and a combination thereof.

5. The holder as claimed in claim 1, wherein the housing comprises an open end, which contacts with the peripheral portion of the sucker.

6. The holder as claimed in claim 1, wherein the sucker wraps the first end of the rod.

* * * * *